US008990493B1

(12) United States Patent
Yu et al.

(10) Patent No.: US 8,990,493 B1
(45) Date of Patent: Mar. 24, 2015

(54) METHOD AND APPARATUS FOR PERFORMING FORCE UNIT ACCESS WRITES ON A DISK

(75) Inventors: Raymond Yu, Irvine, CA (US); Srinivas Neppalli, Irvine, CA (US); Brian E. Jones, Ladera Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 925 days.

(21) Appl. No.: 13/174,547

(22) Filed: Jun. 30, 2011

(51) Int. Cl.
*G06F 12/00* (2006.01)

(52) U.S. Cl.
USPC ............................. 711/113; 711/104; 711/111

(58) Field of Classification Search
None
See application file for complete search history.

(56) References Cited

U.S. PATENT DOCUMENTS

| | | |
|---|---|---|
| 5,530,850 A | 6/1996 | Ford et al. |
| 5,613,066 A | 3/1997 | Matsushima et al. |
| 5,813,025 A | 9/1998 | Murphy et al. |
| 5,822,142 A | 10/1998 | Hicken |
| 6,018,789 A | 1/2000 | Sokolov et al. |
| 6,035,351 A | 3/2000 | Billings et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,092,231 A | 7/2000 | Sze |
| 6,094,707 A | 7/2000 | Sokolov et al. |
| 6,105,104 A | 8/2000 | Guttmann et al. |
| 6,111,717 A | 8/2000 | Cloke et al. |
| 6,112,277 A | 8/2000 | Bui et al. |
| 6,145,052 A | 11/2000 | Howe et al. |
| 6,175,686 B1 | 1/2001 | Noda |
| 6,175,893 B1 | 1/2001 | D'Souza et al. |
| 6,178,056 B1 | 1/2001 | Cloke et al. |
| 6,191,712 B1 | 2/2001 | Still |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,324,604 B1 | 11/2001 | Don et al. |
| 6,327,106 B1 | 12/2001 | Rothberg |
| 6,337,778 B1 | 1/2002 | Gagne |

(Continued)

*Primary Examiner* — Baboucarr Faal

(57) ABSTRACT

A disk drive comprising a rotatable disk, a head actuated over the disk, and a controller is disclosed. The controller is configured to write a first force unit access write data to the cache as part of the cache data, write the first force unit access write data and a first metadata corresponding to the first force unit access write data to the first location by using the head, transmit a first write complete status to a host, and maintain the first force unit access write data in the cache as part of the cache data. The controller is also configured to store write data as part of the cache data. Furthermore, the controller is configured to write the cache data to a third location, and a metadata corresponding to the cache data to the disk.

29 Claims, 13 Drawing Sheets

(56) References Cited

U.S. PATENT DOCUMENTS

| | | |
|---|---|---|
| 6,369,969 B1 | 4/2002 | Christiansen et al. |
| 6,384,999 B1 | 5/2002 | Schibilla |
| 6,385,711 B1 | 5/2002 | Colligan |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,532,517 B1 | 3/2003 | Wagner et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| RE38,502 E | 4/2004 | Yonemitsu et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,751,686 B2 | 6/2004 | Takasugi et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,988,178 B1 | 1/2006 | Shirai et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |

(56) References Cited

U.S. PATENT DOCUMENTS

| | | |
|---|---|---|
| 7,057,836 B1 | 6/2006 | Kupferman |
| 7,062,398 B1 | 6/2006 | Rothberg |
| 7,075,746 B1 | 7/2006 | Kupferman |
| 7,076,603 B1 | 7/2006 | Chheda |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,993 B2 | 8/2006 | Keeler |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,330,417 B2 | 2/2008 | Billau et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,461,202 B2 | 12/2008 | Forrer, Jr. et al. |
| 7,471,483 B1 | 12/2008 | Ferris et al. |
| 7,471,486 B1 | 12/2008 | Coker et al. |
| 7,486,060 B1 | 2/2009 | Bennett |
| 7,490,212 B2 | 2/2009 | Kasiraj et al. |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,574,558 B2 | 8/2009 | Morley et al. |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,904,640 B2 | 3/2011 | Yano et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, Iii et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |

(56) References Cited

U.S. PATENT DOCUMENTS

| | | |
|---|---|---|
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | Deforest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliot et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2004/0019718 A1 | 1/2004 | Schauer et al. |
| 2004/0255093 A1 | 12/2004 | Forrer, Jr. et al. |
| 2005/0036381 A1 | 2/2005 | Hassner et al. |
| 2005/0071537 A1 | 3/2005 | New et al. |
| 2009/0113702 A1 | 5/2009 | Hogg |
| 2010/0306551 A1 | 12/2010 | Meyer et al. |
| 2011/0226729 A1 | 9/2011 | Hogg |
| 2011/0283065 A1* | 11/2011 | Kurashige .................... 711/118 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0201424 A1 | 7/2014 | Chen et al. |

* cited by examiner

FIG. 4
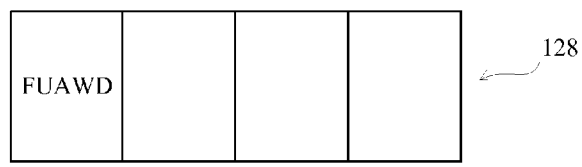
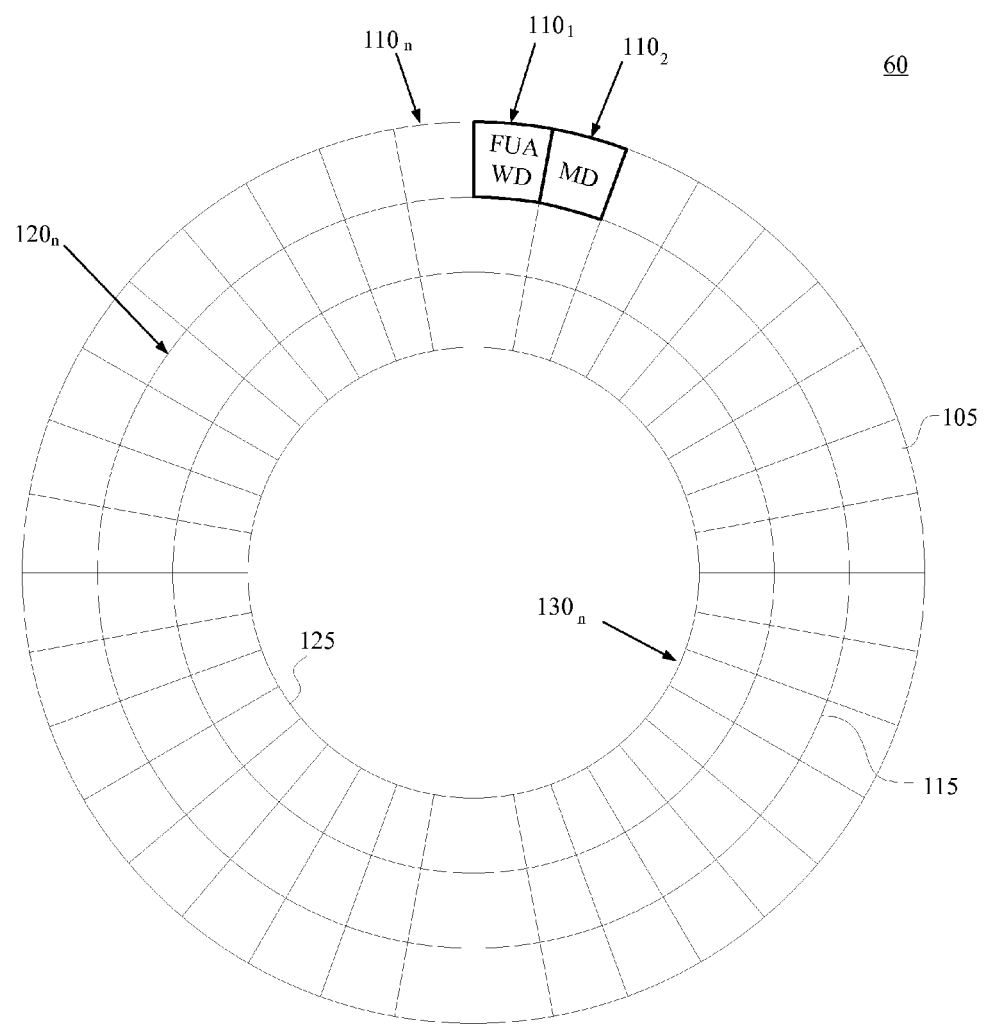
FIG. 5

FIG. 9
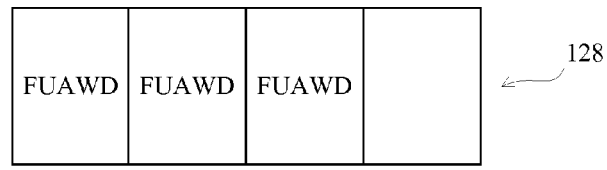
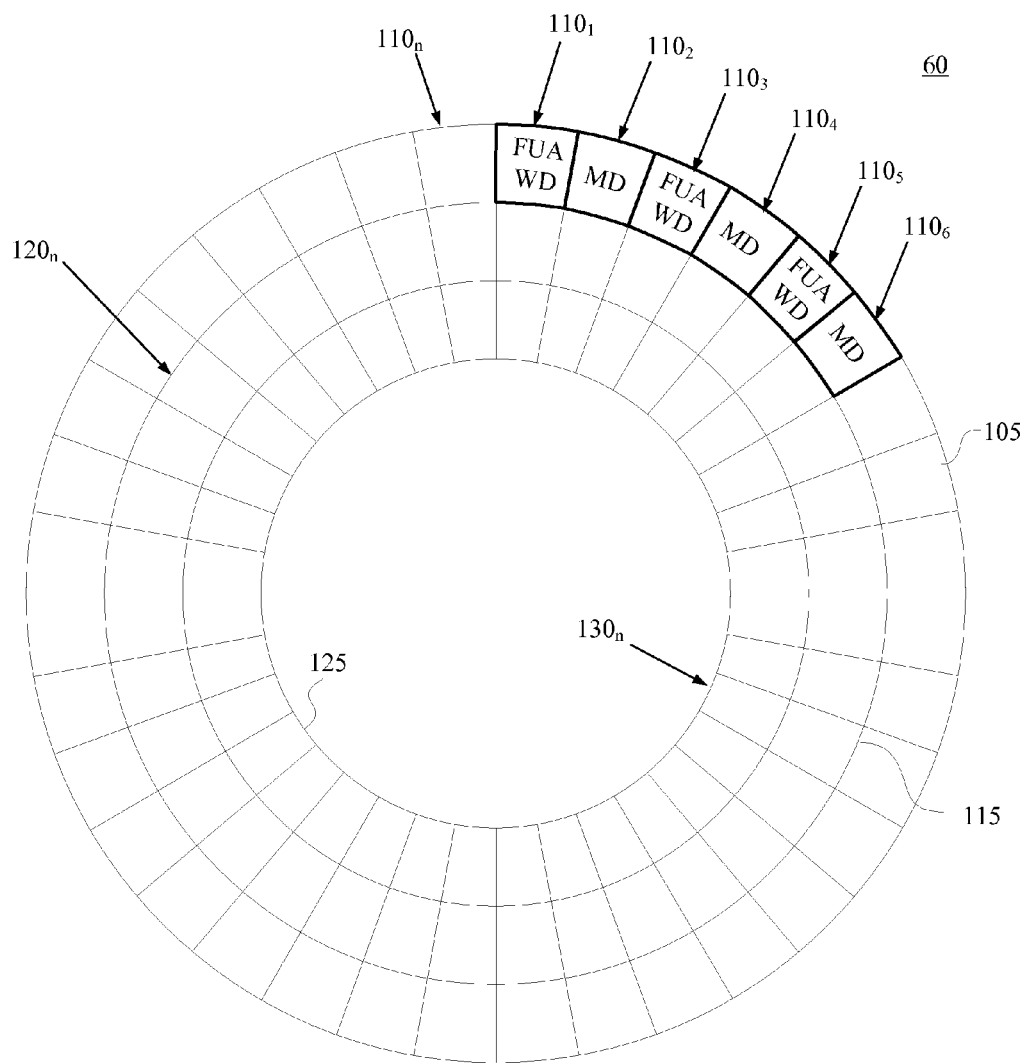
FIG. 10

FIG. 11
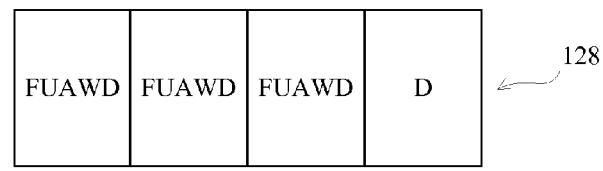
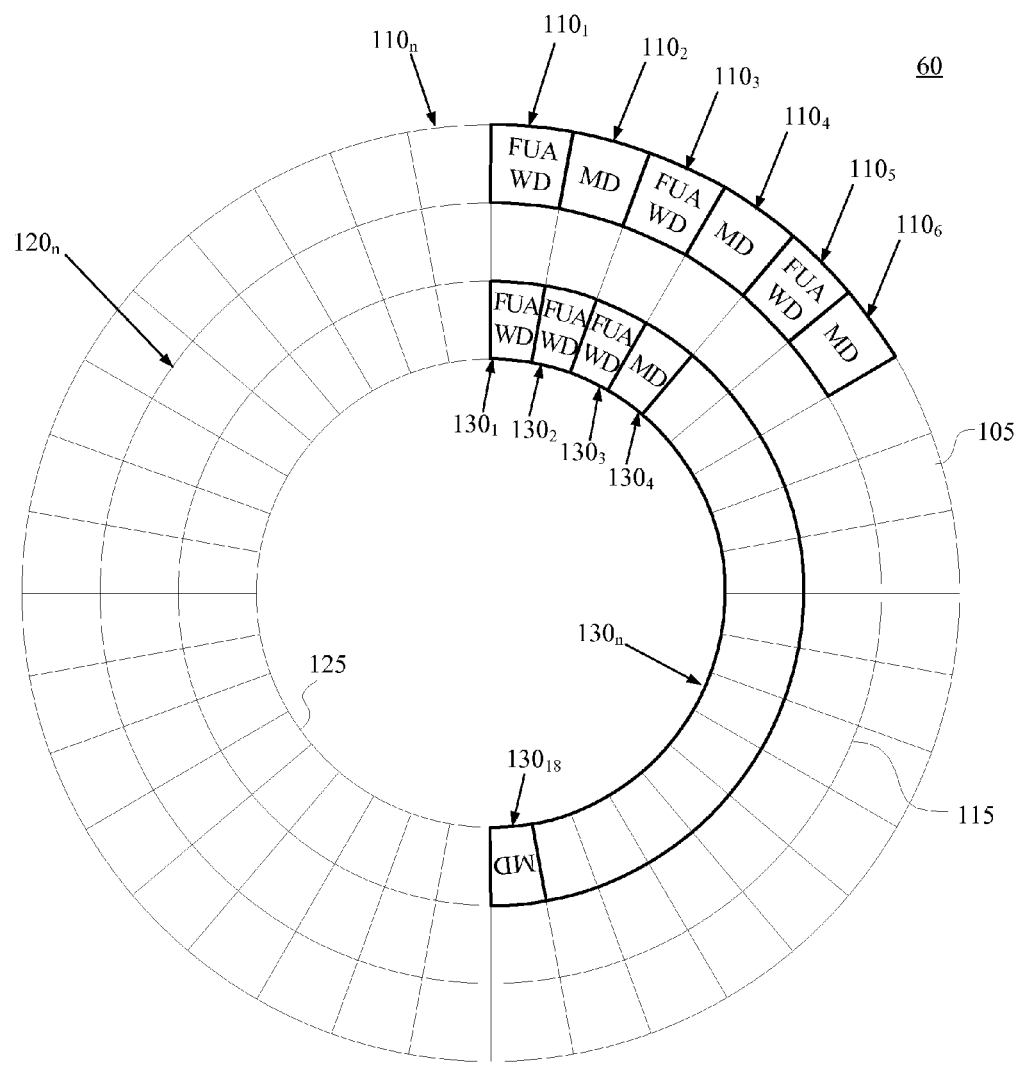
FIG. 12

METHOD AND APPARATUS FOR PERFORMING FORCE UNIT ACCESS WRITES ON A DISK

BACKGROUND

Disk drives are commonly used to store data in computers, databases, digital video records, and other devices. A disk drive comprises a rotating magnetic disk and a head actuated over the disk to magnetically write data to and read data from the disk. The disk drive may write data to and read data from the disk in response to write/read commands from a host that used the disk drive for data storage. When the disk drive receives a force unit access write command it writes force unit access write data directly to the disk instead of just a cache before it completes the command to the host. In the case of shingled magnetic recording, metadata corresponding to the force unit access write data will also typically be written to the disk. This can cause a large accumulation of metadata in the disk. This can be undesirable because the metadata can take up space which could be used for storage of valid data.

BRIEF DESCRIPTION OF THE DRAWINGS

The features and advantages of the present embodiments of the present invention will become more apparent from the detailed description set forth below when taken in conjunction with the drawings, wherein:

FIG. 4 depicts force unit access write data stored in a cache as part of cache data according to an embodiment of the present invention;

FIG. 5 depicts a disk storing force unit access write data according to an embodiment of the present invention;

FIG. 9 depicts force unit access write data stored in a cache as part of cache data according to an embodiment of the present invention;

FIG. 10 depicts a disk storing force unit access write data according to an embodiment of the present invention;

FIG. 11 depicts force unit access write data and other data stored in a cache as part of cache data according to an embodiment of the present invention;

FIG. 12 depicts cache data written on a disk according to an embodiment of the present invention;

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
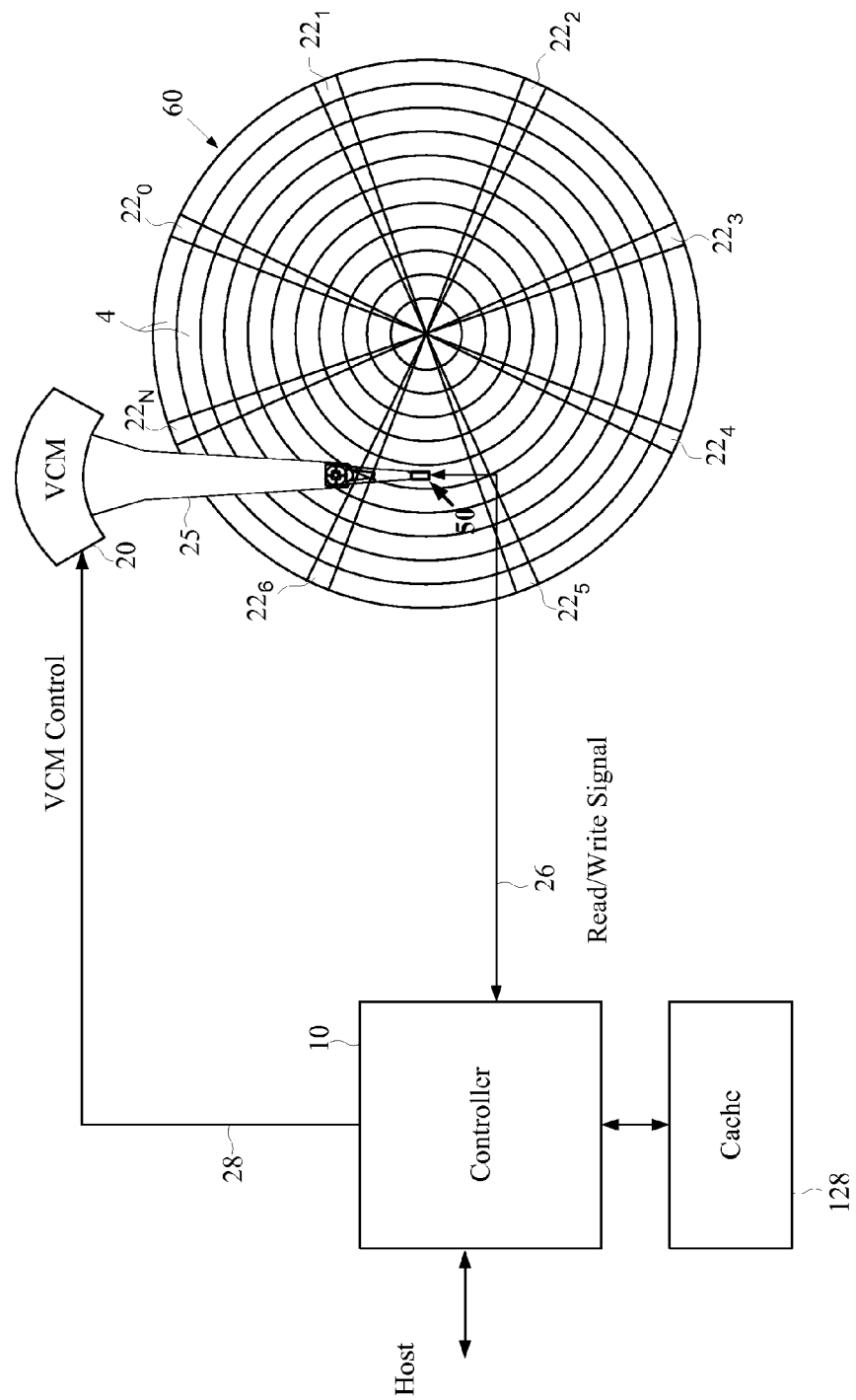
FIG. 1 is a block diagram of a disk drive according to an embodiment of the present invention.

FIG. 1 shows a disk drive 100 according to an embodiment of the present invention. The disk drive 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The disk drive 100 also includes a spindle motor (not shown) for rotating the disk during read/write operations.

The disk drive 100 also comprises a controller 10 that performs various operations of the disk drive 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The disk 60 comprises a number of radially spaced, concentric tracks 4. The tracks 4 can overlap, and thus can be shingled. Each track 4 may be divided into a number of sectors (shown in FIG. 5) that are spaced circumferentially along the track 4. The sectors may be used to store user data and/or other information. The disk 60 may also comprise a plurality of angularly spaced servo wedges $22_0$-$22_N$, each of which may include embedded servo information that can be read from the disk 60 by the head 50 to determine the position of the head 50 over the disk 60. For example, each servo wedge $22_0$-$22_N$ may include a pattern of alternating magnetic transitions (servo burst), which may be read from the disk 60 by the head 50 and processed by the controller 10 to estimate the position of the head 50 relative to the disk 60. The angular spacing between the servo wedges $22_0$-$22_N$ may be uniform, as shown in the example in FIG. 1.

To write data to the disk 60, the controller 10 may first position the head 50 at a desired track 4 on the disk 60 by sending a control signal input 28 (e.g., control current) to the VCM 20. The controller 10 may include a servo control system that positions the head 50 using the VCM 20 based on position information read from one or more servo wedges $22_0$-$22_N$. The controller 10 processes data to be written to the disk 60 into a write signal 26, which is outputted to the head 50. The head 50 converts the write signal 26 into a magnetic field that magnetizes the surface of the disk 60 based on the write signal, thereby magnetically writing the data to the disk 60.

To read data from the disk 60, the controller 10 positions the head 50 at a desired track 4 on the disk 60. The head 50 generates a read signal based on the magnetization of the disk surface under the head 50. The controller 10 receives and processes the read signal 26 into data, thereby reading the data from the disk 60.

The controller 10 may write data to and read data from the disk 60 in response to write/read commands from a host (e.g., host processor). When the controller 10 receives a host write command including data to be written to the disk 60, the controller 10 may temporarily hold the data from the host in a cache 128 (e.g., DRAM) and write the data from the cache 128 to the disk 60 using the head 50. When the controller 10 receives a host read command requesting data stored on the disk 60, the controller 10 may read the requested data from the disk 60, temporarily hold the read data in the cache and send the read data from the cache to the host.

However, when the controller 10 receives a force unit access command from a host, the controller 10 writes force unit access write data to the cache 128 as part of the cache data. The controller 10 then writes the force unit access write data and also a metadata corresponding to the force unit access write data to a first location in the disk 60. The metadata can be, for example, a header in front of the write data, a footer after the write data, and/or a write log that is many sectors before or after the write data containing metadata for nearby sectors. The metadata can include logical-to-physical mapping information, such as what Logical Block Address (LBA) is found in Physical Block Addresses (PBA) near the metadata. Wherever it is located, the metadata can be used to update a mapping table in case a power loss is encountered before the mapping table is updated and stored in non-volatile memory. The first location can be part of, for example, a first shingled zone.

Figure 2:
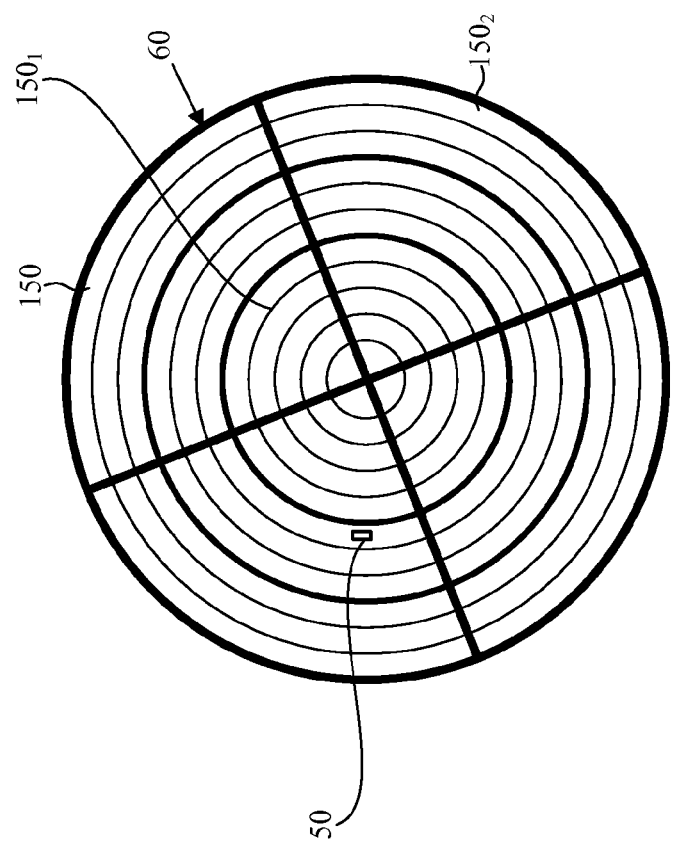
FIG. 2 depicts various shingled zones in a disk according to an embodiment of the present invention.

As seen in FIG. 2, the disk 60 can include a plurality of shingled zones 150 and the first location can be located in one of the plurality of shingled zones 150 according to an embodiment of the present invention. Each of the shingled zones 150 can comprise portions of one or more of the track 4. Furthermore, one or more of the shingled zones 150 can be a shingled zone allocated for force unit access write data such as the shingled zone $150_1$ and the shingled zone $150_2$. In one embodiment, a shingled zone allocated for force unit access write data can be smaller than the shingled zones used for other data. This can be done because the data in the shingled zone allocated for force unit access write data can constantly be invalidated and overwritten, thus conserving space on the disk 60 for the shingled zones used for other data.

In one embodiment, when writing to a shingled zone allocated for force unit access write data, the controller 10 can determine which shingled zone allocated for force unit access write data is closest to the head 50 when the controller 10 receives a force unit access write command from the host. The controller 10 can then control the head 50 to write the force unit access write data and its corresponding metadata onto that shingled zone allocated for force unit access write data which is closest to the head 50. For example, in FIG. 2, the shingled zone $150_1$ is closest to the head 50. Thus, the controller 10 will write the force unit access write data and its corresponding metadata to the shingled zone $150_1$.

The controller 10 can also repeat the above process for additional force unit access write commands and write, for example, a subsequent force unit access write data to a second location. The second location can be located, for example, in the first shingled zone, or in a shingled zone different from the first shingled zone. The second shingled zone can also be a shingled zone allocated for force unit access write data.

Figure 3:
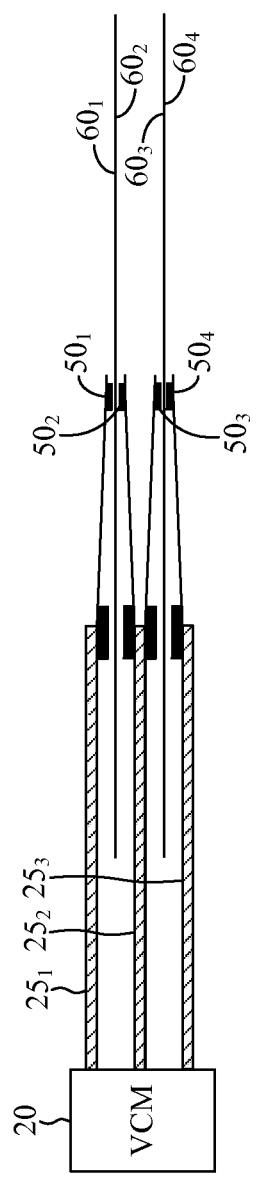
FIG. 3 depicts multiple disks in a disk drive according to an embodiment of the present invention.

Furthermore, although in FIGS. 1 and 2, the disk 60 includes single disk with a single surface, the disk 60 can include multiple disks, and comprise multiple surfaces as seen in FIG. 3. In FIG. 3, the disk 60 can include multiples disks with the disk surfaces $60_1$, $60_2$, $60_3$, and $60_4$. The disk surfaces $60_1$ and $60_2$ can be formed on opposite sides of one disk, while the disk surfaces $60_3$ and $60_4$ can be formed on opposite sides of another disk. Each of the disk surfaces $60_1$, $60_2$, $60_3$, and $60_4$ can also have a corresponding head from the heads $50_1$, $50_2$, $50_3$, and $50_4$ to perform read/write operations on each of the disks. Furthermore, actuator arms $25_1$, $25_2$, and $25_3$ can be used to move the heads $50_1$, $50_2$, $50_3$, and $50_4$. Since there are multiple disks, the shingled zones allocated for force unit access write data could be spread out over various disks. The controller 10 can determine which shingled zone allocated for force unit access write data is closest to one of the heads $50_1$, $50_2$, $50_3$, and $50_4$, even if such shingled zone is on a different disk.

In one embodiment, after the metadata is written on the disk 60, the controller 10 can transmit a write complete status to the host. Instead of erasing or overwriting the force unit access write data in the cache 128, the controller 10 maintains the force unit access write data in the cache. When the cache 128 is full or when a cache flush should be performed, the controller 10 writes the cache data including the force unit access write data to the disk 60 at a third location. The third location can be located in a different location than the first location, and the second location. The third location can be selected, for example, to be located sequentially after a location in the plurality of the tracks that the head 50 was performing a write operation on before the cache flush. Alternatively, the force unit access write data can be written at a time separate from a cache flush.

When the first location and the second location are part of the first shingled zone, the third location can be part of a second shingled zone. However, when the first location is part of the first shingled zone, and the second location is part of the second shingled zone, the third location can be part of a third shingled zone. The controller 10 can also write a metadata corresponding to the cache data in the third location.

After the cache data and the metadata corresponding to the cache data has been written to the third location, the controller 10 can optionally update the mapping table entry for the force unit access write data to point to the new physical location. Also, in one embodiment, when the first location and the second location are part of the first shingled zone, the controller 10 can decrement a first valid data counter corresponding to the first shingled zone and increment a second valid data counter corresponding to the second shingled zone. In another embodiment, when the first location is part of the first shingled zone, and the second location is part of the second shingled zone, the controller 10 can decrement a first valid data counter corresponding to the first shingled zone, and a second valid data counter corresponding to the second shingled zone. The controller 10 can also increment a third valid data counter corresponding to the third shingled zone, which contains the third location.

Although the examples disclosed herein may utilize a valid data counter to keep track of the number of valid data in a shingled zone, in one embodiment, the controller 10 can utilize other means for keeping track of the number of valid data in a shingled zone. For example, in one embodiment the controller 10 can compare the metadata to the mapping table to determine whether the data in the physical location on the disk is valid or invalid.

In one embodiment, the controller 10 can perform garbage collection on the disk 60. During garbage collection, the controller 10 can move valid data from a first shingled zone to a second shingled zone in order to reduce an amount of valid data in the first shingled zone or ensure that the first shingled zone contains no valid data. Garbage collection can free up contiguous space for valid data to be written in one or more shingled zones. When there is no valid data in a shingled zone, garbage collection can be simplified or eliminated as all the data in the shingled zone is invalid and can be overwritten. Likewise, when there is a reduced amount of valid data in a shingled zone, garbage collection may be simplified as there will be less valid data to gather and relocate.

Figure 6:
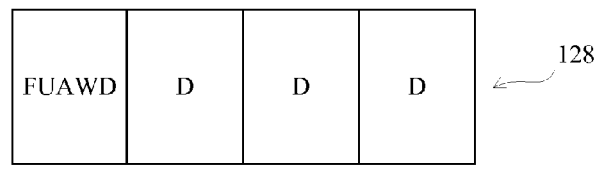
FIG. 6 depicts force unit access write data and other data stored in a cache as part of cache data according to an embodiment of the present invention.

FIGS. 4-6 depict a force unit access write operation and a cache flush for a single force unit access write data according to one embodiment. In FIG. 4, when the controller 10 receives a force unit access write command, a force unit access write data (FUAWD) is written to the cache 128 as cache data. The controller 10 then writes the force unit access write data and a metadata (MD) to the disk 60. As seen in FIG. 5, the disk 60 includes a plurality of sectors designated by $110_n$, $120_n$, and $130_n$. In FIG. 5, the force unit access write data is written to the sector $110_1$, while the metadata is written to the sector $110_2$. In this embodiment, the metadata is shown as a footer, however, as described above, a header and/or a write log could be written. The sectors $110_1$ and $110_2$ are located in the first location, which can be part of a first shingled zone. The first shingled zone can be a shingled zone allocated for force unit access write data. The controller 10 can then transmit a write complete status to the host.

Although the examples disclosed herein may depict a single force unit access write data being written to a single sector from a single force unit access write command, in one embodiment, one or more force unit access write data can be written to multiple sectors from a single force unit access write command.

In FIG. 6, the cache 128 can be full or store sufficient data (D) that a cache flush can or should be performed according to one embodiment. The data can include other force unit access write data or other various data. A cache flush can also be performed when the controller 10 indicates that a cache flush should be performed, regardless of how much data is in the cache 128. During a cache flush, for example, all or a portion of the cache data is written to the disk 60. For example, in FIG. 7, the cache data including the force unit access write data is written to the sector $130_1$. Other data may be written, for example, to sectors $130_2$-$130_5$. The other data need not be force unit access write data. A metadata corresponding to the cache data and the other data can be written, for example, in sector $130_6$. Furthermore, a metadata is also written in the sector $130_{18}$ for the half-track containing the sectors $130_1$-$130_{18}$. Although in the examples disclosed herein, metadata can be written for every half-track, in one embodiment, metadata can also be written for any sized portion of the track 4. In one embodiment, a single metadata can also be written for multiple tracks. Also, the metadata in sector $130_6$ need not be written if data fills up the half-track because the metadata in the sector $130_{18}$ can be used, obviating the need for the metadata in the sector $130_6$.

The sectors $130_1$-$130_{18}$ can be located in a second location. As can be seen, the second location is at a different location than the first location. In one embodiment, the second location can be a second shingled zone, different than the first shingled zone. Optionally, the second shingled zone can be a shingled zone allocated for force unit access write data. In one embodiment, the second location can be selected to be located sequentially after a location in the plurality of tracks that the head 50 was performing a write operation on before the cache flush.

In one embodiment, after the cache data and the metadata corresponding to the cache data are written at the second location, a first valid data counter corresponding to the first shingled zone is decremented, while a second valid data counter corresponding to the second shingled zone is incremented.

Figure 8:
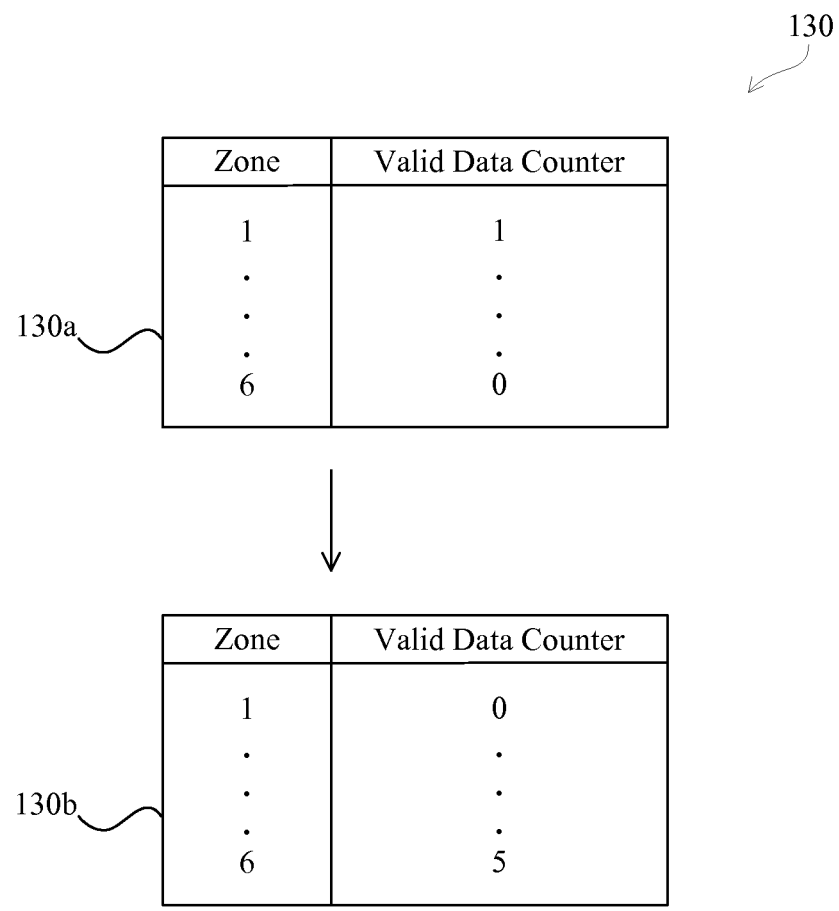
FIG. 8 depicts tables of valid data counters corresponding to various zones in a disk according to an embodiment of the present invention.

For example, as seen in FIG. 8, a table 130a indicates a valid data counter corresponding to the various zones prior to the cache flush according to one embodiment. A first valid data counter corresponding to the first shingled zone (zone 1) indicates that there is a single valid data in the first shingled zone (zone 1). A second valid data counter corresponding to the second shingled zone (zone 2) indicates that there is no valid data in the second shingled zone. However, once the cache data and its corresponding metadata has been written to the disk 60, the table 130a can be updated to provide appropriate decrements and increments to the valid data counters.

For example, the table 130b is the updated table 130a and indicates valid data counters corresponding to the various zones after the cache flush. As seen in table 130b, the first valid data counter corresponding to the first shingled zone (zone 1) is decremented to indicate that there is now no valid data in the first shingled zone (zone 1). That is, the first location no longer contains any valid data, and any data in the shingled zone can be overwritten. Furthermore, the second valid data counter corresponding to the second shingled zone (zone 6) is incremented to indicate that there is now five valid data in the second shingled zone (zone 6).

FIGS. 9-16 illustrate multiple force unit access write operations and a cache flush for multiple force unit access write data in one embodiment. In FIG. 9, the controller 10 writes multiple force unit access write data to the cache 128 as part of the cache data in response to multiple force unit access write commands. In FIG. 10, the controller 10 writes the force unit access write data to the disk 60 in the first location. Furthermore the controller 10 can write a metadata for each of the force unit access write data. Thus, the force unit access write data and their corresponding metadata are written to the sectors $110_1$-$110_6$. The controller 10 can then transmit a write complete status to the host after each force unit access write data and corresponding metadata is written to the disk. The sectors $110_1$ and $110_2$ can be located in a first location, the sectors $110_3$ and $110_4$ can be located in a second location, and the sectors $110_5$ and $110_6$ can be located in a third location. The first location, the second location, and the third location can be part of, for example, a first shingled zone.

In FIG. 11, the cache 128 is ready for a cache flush. In FIG. 12, the controller 10 performs a cache flush by writing some or all of the cache data to the disk 60. Thus, the force unit access data in the cache data are written in the sectors $130_1$, $130_2$, and $130_3$. The sectors $130_1$-$130_{18}$ can be a fourth location. The fourth location can be at a different location than the first location, the second location, and the third location. In one embodiment, the fourth location can be part of a second shingled zone, different than the first shingled zone. Optionally, the second shingled zone can also be a shingled zone allocated for force unit access write data. In one embodiment, the fourth location can be selected to be located sequentially after a location in the plurality of tracks that the head 50 was performing a write operation on before the cache flush.

Furthermore, the controller 10 writes a metadata corresponding to the cache data in the sector $130_4$. In one embodiment, a metadata for the half a track containing the fourth location is also written in sector $130_{18}$. As can be seen, instead of using three metadata in FIG. 10, only two metadata are now used in FIG. 12. Furthermore, in one embodiment, if the cache data encompasses a full half-track, only a single metadata is used and the metadata in sector $130_4$ would not be used.

Figure 13:
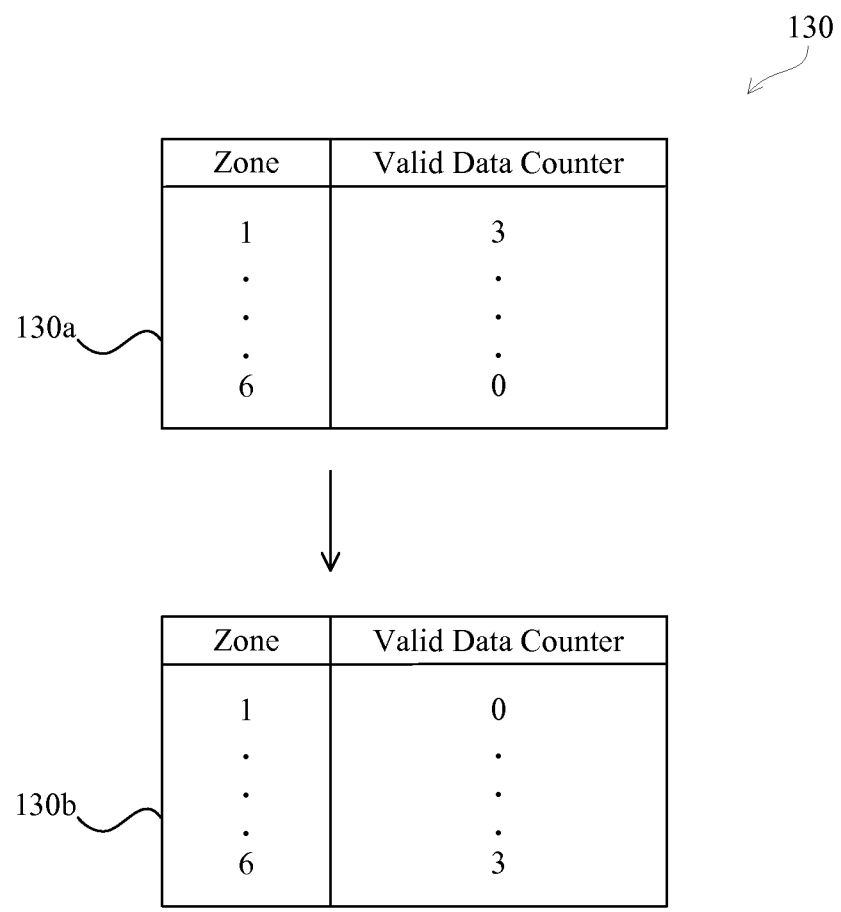
FIG. 13 depicts tables of valid data counter corresponding to various zones in a disk according to an embodiment of the present invention.

As seen in FIG. 13, the controller 10 can then update the valid data counters indicated in the tables 130a and 130b according to one embodiment. Thus, a first valid data counter indicates that the first shingled zone (zone 1) originally had three valid data, while the second valid data counter indicates that the second shingled zone (zone 6) had none as shown in table 130a and FIG. 12. However, the controller updates the table 130a as shown in table 130b by decrementing and incrementing the appropriate valid data counters. Thus, the first valid data counter is decremented to zero, while the second valid data counter is incremented to three.

Figure 14:
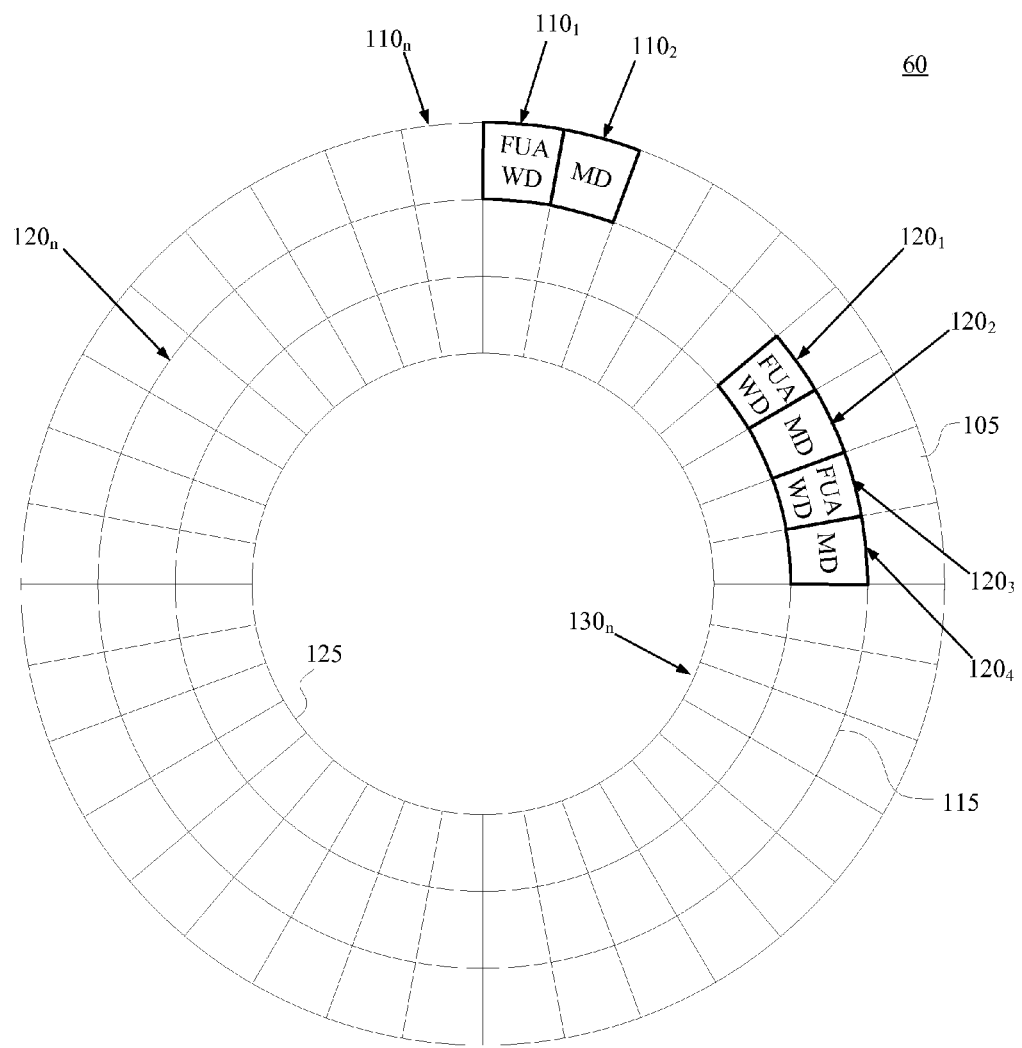
FIG. 14 depicts a disk storing force unit access write data according to an embodiment of the present invention.

However, instead of writing all of the force unit access write data in FIG. 9 to the same shingled zone as shown in FIG. 10, in one embodiment, the controller 10 can write the force unit access write data to different shingled zones as shown in FIG. 14.

For example, the controller can write a first force unit access write data and its corresponding metadata to the sectors $110_1$, and $110_2$. The sectors $110_1$ and $110_2$ are located in a first location. The first location can be a first shingled zone. Furthermore, in FIG. 14, additional data may be located in the first shingled zone which are not shown.

The controller can also write a third force unit access write data, a fourth force unit access write data, and their corresponding metadata to the sectors $120_1$, $120_2$, $120_3$, and $120_4$ respectively. The sectors $120_1$, $120_2$, $120_3$, and $120_4$, are located in a second location and a third location different from the first location. The second location and the third location can be a second shingled zone different from the first shingled zone. Furthermore, in FIG. 14, additional data may be located in the second shingled zone, which are not shown.

Figure 15:
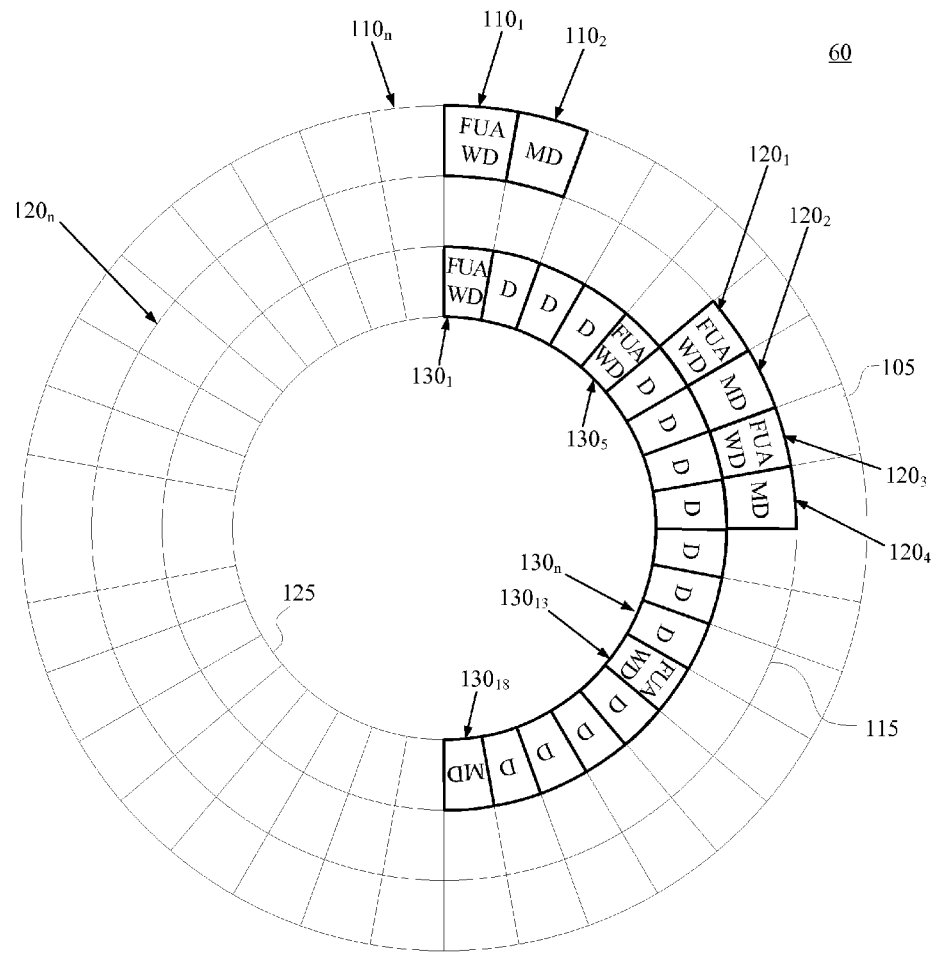
FIG. 15 depicts cache data written on a disk according to an embodiment of the present invention.

As seen in FIG. 15, during a cache flush, the cache data can be written in the sectors $130_1$-$130_{18}$ according to one embodiment. The sectors $130_1$-$130_{18}$ can be located in a fourth location. The fourth location is at a different location than the first location, the second location, and the third location. In one embodiment, the third location can be a third shingled zone, different than the first shingled zone or the second shingled zone. In one embodiment, the third shingled location can be selected to be located sequentially after a location in the plurality of tracks that the head 50 was performing a write operation on before the cache flush.

In one embodiment, the controller 10 can write the force unit access write data contained in the cache data together during a cache flush, and continue to write data from other write commands from the host after the cache flush is completed. The other write commands from the host need not be force unit access write commands. In such a case, the force unit access write data can be located in adjacent sectors such as sectors $130_1$-$130_3$ instead of $130_1$, $130_5$, and $130_{13}$. In addition, the data written adjacent the force unit access write data need not be cache data. Furthermore, in one embodiment, the force unit access write data need not be written to the beginning sectors of the half-track during a cache flush, and could be written, for example, in the sectors $130_6$-$130_8$. In such a case, the head 50 could write data from other write commands from the host before and after the cache flush.

In FIG. 15, the third shingled zone is not a shingled zone allocated for force unit access write data as indicated by the other data (D) being written in the third shingled zone. However, in alternate embodiments, the third shingled zone could be dedicated to just force unit access write data without having other data. In such a case, the other data may not be written to the third shingled zone. In one embodiment, the first shingled zone and the second shingled zone need not be shingled zones allocated for force unit access write data. However, one or more of the first shingled zone, and the second shingled zone could be a shingled zone allocated for force unit access write data.

In FIG. 15, the cache data encompasses a half-track, and therefore a single metadata can be used. This can save space in the disk 60 because a single metadata instead of three metadata is used. However, if the cache data encompasses less than the half-track, an additional metadata can be used. This would still provide space savings because two metadata instead of three metadata would be used.

Figure 16:
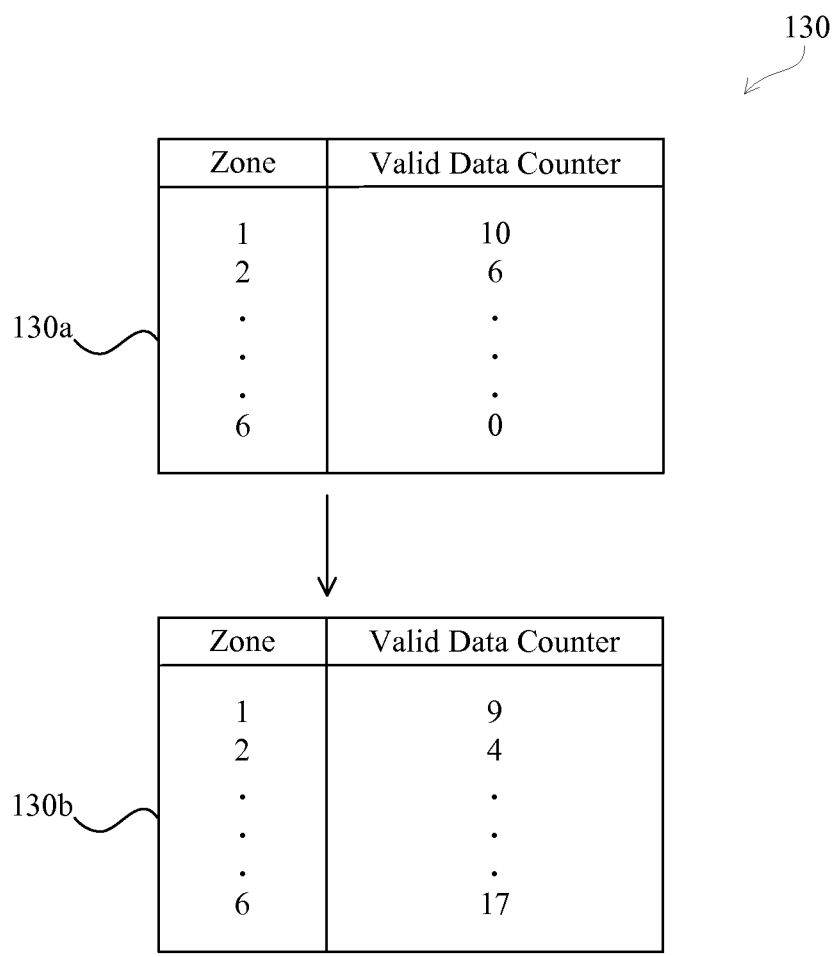
FIG. 16 depicts tables of valid data counter corresponding to various zones in a disk according to an embodiment of the present invention.

In FIG. 16, the appropriate valid data counters can be decremented and incremented as shown in tables 130a and 130b according to one embodiment. In table 130a, the first valid data counter indicates that the first shingled zone (zone 1) included 10 valid data, the second valid data counter indicates that the second shingled zone (zone 2) included 6 valid data, and the third shingled zone (zone 6) included 0 valid data in FIG. 14. Valid data includes other types of data aside from force unit access write data, and are not shown in FIG. 14.

In the updated table 130b, the first valid data counter indicates that the first shingled zone (zone 1) now includes only 9 valid data since the force unit access write data located in sector $110_1$ is now invalid data, and the second valid data counter indicates that the second shingled zone (zone 2) now includes only 4 valid data since the force unit access write data located in the sectors $120_1$ and $120_3$ are now invalid data. Furthermore, the third valid data indicates that there are now 17 valid data since force unit access write data and other data are located in the sectors $130_1$-$130_{18}$.

Figure 17:
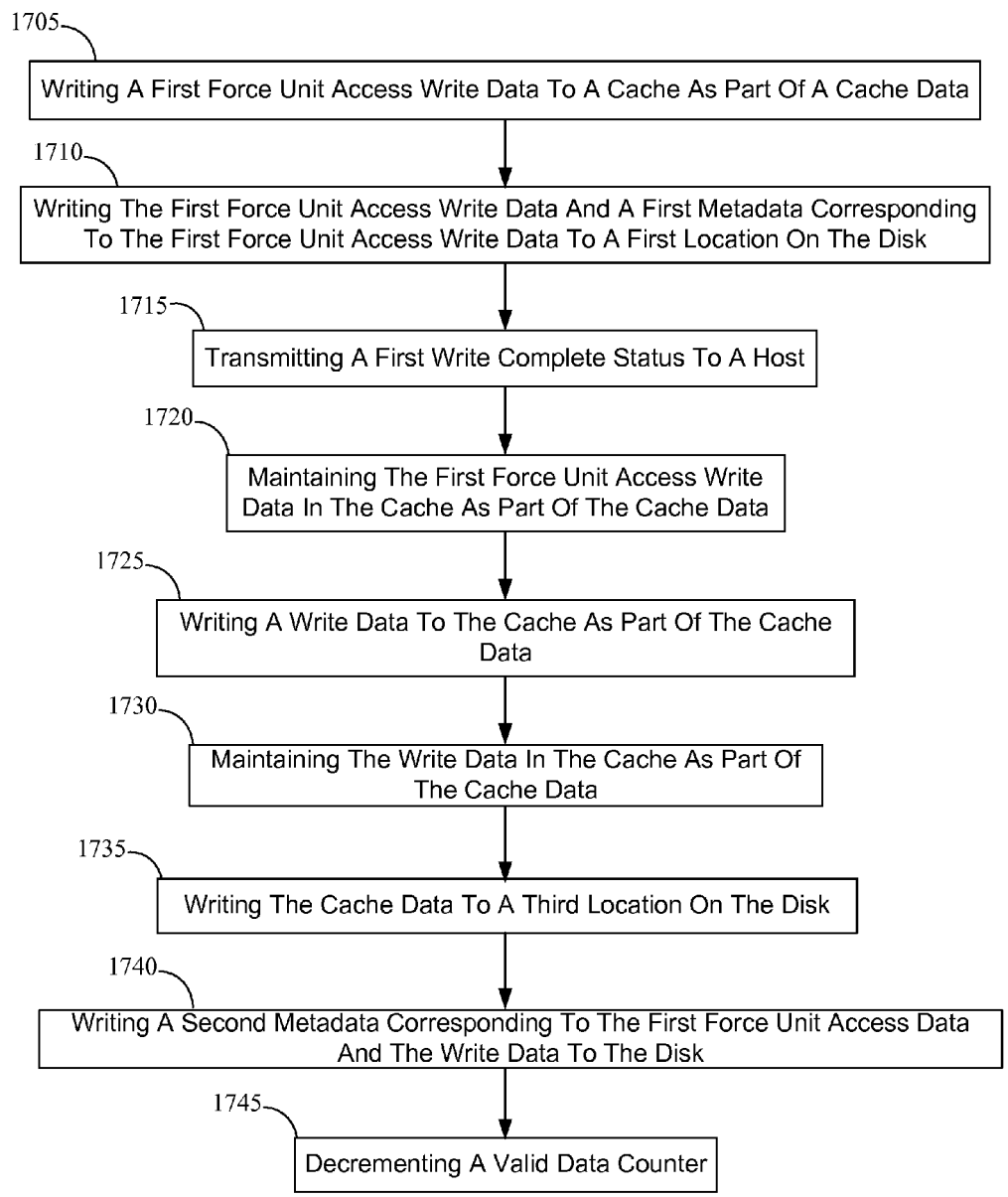
FIG. 17 depicts a process according to an embodiment of the present invention.

In one embodiment, the present invention is a process as shown in FIG. 17. In Step 1705, a first force unit access write data is written to a cache as part of a cache data. For example, the controller 10 can write a first force unit access write data to the cache 128 as part of a cache data. The controller 10 can write the first force unit access write data to the cache 128 in response to a first force unit access write command from a host.

In Step 1710, a first force unit access write data and a first metadata corresponding to the first force unit access write data are written to a first location on a disk. For example, the controller 10 can write the first force unit access write data and a first metadata corresponding to the first force unit access write data to a first location on a disk 60. The first location can be, for example, a first shingled zone. The first shingled zone can optionally be a shingled zone allocated for force unit access write data. In one embodiment, the first shingled zone can be, for example, a shingled zone located closest to a position of the head 50 when the controller 10 received a force unit access write command from the host. In the case of dynamic mapping, the first shingled zone need not be a shingled zone allocated for force unit access write data, but instead could be any other location in the disk 60.

In Step 1715, a first write complete status is transmitted to a host. For example, the controller 10 can transmit a first write complete status to the host. In Step 1720, the first force unit access write data is maintained in the cache as part of the cache data. For example, the controller 10 can maintain the first force unit access write data in the cache 128 as part of the cache data.

In Step 1725, a write data is written to the cache as part of the cache data. For example, the controller 10 can write a write data to the cache 128 as part of the cache data. The write data can be, for example, a second force unit access write data. The controller 10 can write the second force unit access write data to the cache 128 in response to a second force unit access write command from the host. Furthermore, the second force unit access write data can be written, for example, to a second location. The second location can be, for example, a second shingled zone. The second shingled zone can be, for example, a shingled zone located closest to a position of the head 50 when the controller 10 received a force unit access write command from the host. In the case of dynamic mapping, the second shingled zone need not be a shingled zone allocated for force unit access write data, but instead could be any other location in the disk 60.

In Step 1730, the write data is maintained in the cache as part of the cache data. For example, the controller 10 can maintain the write data in the cache 128 as part of the cache data. In Step 1735, the cache data is written to a third location on the disk. For example, the controller 10 can write the cache data to a third location on the disk. The third location can be part of, for example, a second shingled zone when the first location and the second location are part of the first shingled zone. In the case of dynamic mapping, the second shingled zone need not be a shingled zone allocated for force unit access write data, but instead could be any other location in the disk 60.

When the first location is part of the first shingled zone and the second location is part of the second shingled zone, the third location can be part of a third shingled zone different from the first shingled zone and the second shingled zone. The third shingled zone can optionally be a shingled zone allocated for force unit access write data. In the case of dynamic mapping, the third shingled zone need not be a shingled zone allocated for force unit access write data, but instead could be any other location in the disk 60.

Furthermore, the third location, regardless of whether it is part of the second shingled zone or the third shingled zone can optionally be selected to be located sequentially after a location in the plurality of tracks that the head was performing a write operation on before the cache flush.

In Step 1740, a second metadata corresponding to the cache data is written to the disk. For example, the controller 10 writes the second metadata corresponding to the cache data to the third location.

In Step 1745, a valid data counter is decremented. For example, the controller 10 can decrement a first valid data counter corresponding to the first shingled zone and a second valid data counter corresponding to the second shingled zone. Furthermore, the controller 10 can also increment a third valid data counter corresponding to the third shingled zone.

When the first location and the second location are part of the first shingled zone, and the third location is part of the second shingled zone, then the controller 10 decrements a first valid data counter corresponding to the first shingled zone. The controller 10 can also increment a second valid data counter corresponding to the second shingled zone.

Although the above description utilizes shingled zones, the disk 60 can utilize segments of varying sizes instead of or in addition to the shingled zones. Furthermore, the segments can be zones instead of shingled zones. Optionally, one or more of the segments can be dedicated to force unit access write data.

Figure 7:
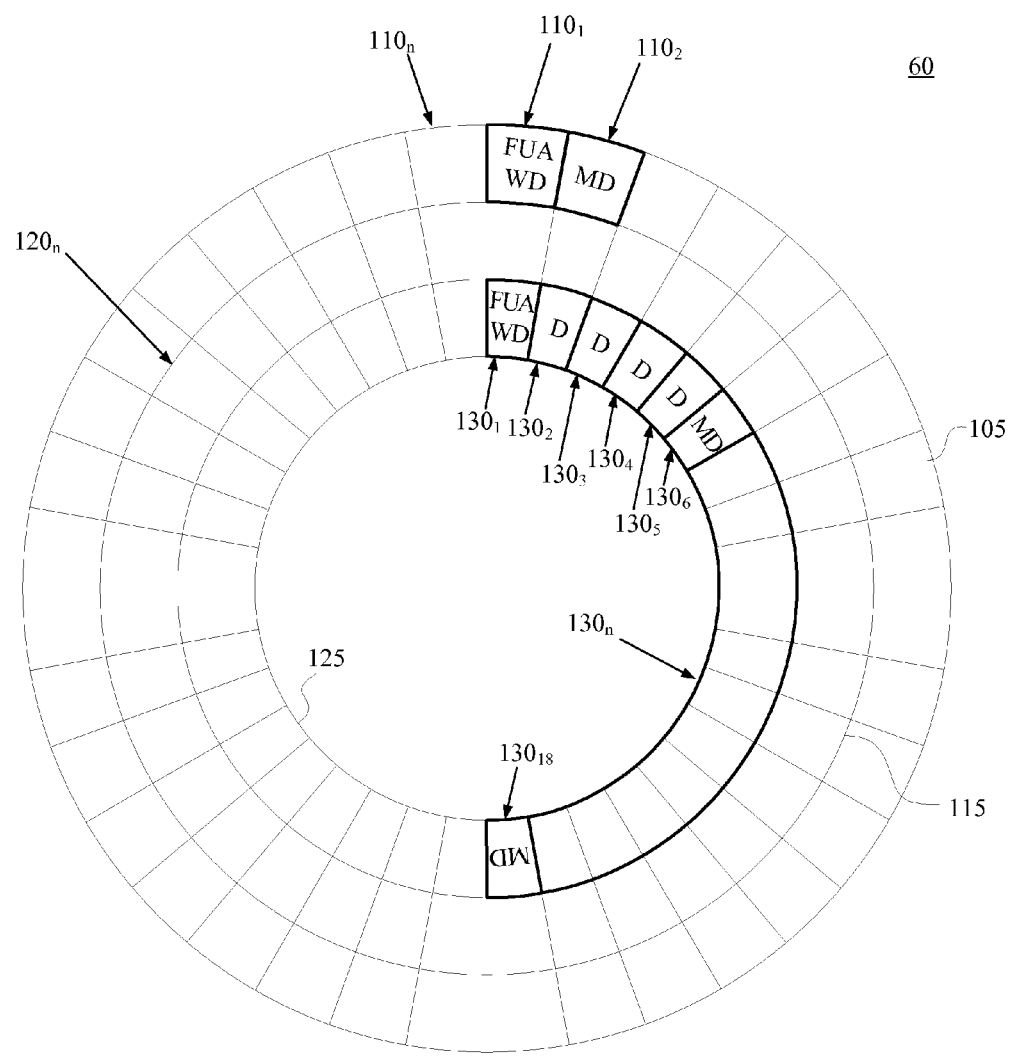
FIG. 7 depicts cache data written on a disk according to an embodiment of the present invention.

For example, in FIG. 5, the first location including the sectors $110_1$ and $110_2$ can be part of a first segment, while in FIG. 7, the second location including the sectors $130_1$-$130_{18}$ can be part of a second segment. In FIG. 10, the first location, the second location, and the third location including the sectors $110_1$-$110_6$ can be part of a first segment, while in FIG. 12, the fourth location including the sectors $130_1$-$130_{18}$ can be part of a second segment. In FIG. 14, the first location including the sectors $110_1$ and $110_2$ can be part of a first segment, and the second location and the third location including the sectors $120_1$-$120_4$ can be part of the second segment. In FIG. 15, the fourth location including the sectors $130_1$-$130_{18}$ can be part of a third segment.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:
1. A disk drive comprising:
 a rotatable disk including a plurality of tracks having a first location, a second location, and a third location different from the first location and the second location;
 a head actuated over the disk;
 a cache configured to store cache data; and
 a controller configured to:
  receive a first force unit access write command from a host;
  write a first force unit access write data to the cache as part of the cache data, write the first force unit access write data and a first metadata corresponding to the first force unit access write data to the first location by using the head, transmit a first write complete status to the host, maintain the first force unit access write data in the cache as part of the cache data, write a write data to the cache as part of the cache data, maintain the write data in the cache as part of the cache data, write the cache data including the first force unit access data and the write data to the third location, and write a second metadata corresponding to the first force unit access write data and the write data to the disk.

2. The disk drive of claim 1, wherein the write data comprises a second force unit access write data and the controller is further configured to:

write the second force unit access write data to the cache as part of the cache data, write the second force unit access write data and a third metadata corresponding to the second force unit access write data to the second location by using the head, and transmit a second write complete status to the host.

3. The disk drive of claim 2 wherein the controller is further configured to receive a second force unit access write command from the host.

4. The disk drive of claim 2 wherein the second metadata is written to the third location.

5. The disk drive of claim 4 wherein the first location and the second location are part of a first shingled zone, and the third location is part of a second shingled zone different from the first shingled zone.

6. The disk drive of claim 5 wherein the first shingled zone is a shingled zone allocated for force unit access write data.

7. The disk drive of claim 5 wherein the controller is further configured to determine that the first shingled zone is a shingled zone located closest to a position of the head when the controller received a force unit access write command from the host.

8. The disk drive of claim 5 wherein the rotatable disk stores a valid data counter corresponding to the first shingled zone, and after the cache data and the second metadata is written to the second shingled zone, the controller is further configured to decrement the valid data counter corresponding to the first shingled zone.

9. The disk drive of claim 4 wherein the rotatable disk stores a mapping table, and the controller is further configured to update the mapping table after the controller writes the cache data and the second metadata to the third location.

10. The disk drive of claim 4 wherein the plurality of tracks stores a valid data counter corresponding to a segment of the plurality of tracks, wherein the first location and the second location are located in the segment.

11. The disk drive of claim 10 wherein after the cache data and the second metadata are written to the third location, the controller is further configured to decrement the valid data counter corresponding to the segment.

12. The disk drive of claim 4 wherein the plurality of tracks stores a first valid data counter corresponding to a first segment of the plurality of tracks, and a second valid data counter corresponding to a second segment of the plurality of tracks, wherein the first location is located in the first segment, and the second location is located in the second segment.

13. The disk drive of claim 12 wherein after the cache data and the second metadata are written to the third location, the controller is further configured to decrement the first valid data counter and the second valid data counter.

14. The disk drive of claim 1 wherein the controller is further configured to write the cache data to the third location during a cache flush.

15. The disk drive of claim 14 wherein the third location is selected to be located sequentially after a location in the plurality of tracks that the head was performing a write operation on before the cache flush.

16. A method for writing force unit access write data to a cache and a disk including a first location, a second location, and a third location different from the first location and the second location comprising:

receiving a first force unit access write command from a host;

writing a first force unit access write data to a cache as part of a cache data;

writing the first force unit access write data and a first metadata corresponding to the first force unit access write data to the first location on the disk;

transmitting a first write complete status to the host;

maintaining the first force unit access write data in the cache as part of the cache data;

writing a write data to the cache as part of the cache data;

maintaining the write data in the cache as part of the cache data;

writing the cache data including the first force unit access write data and the write data to the third location on the disk; and writing a second metadata corresponding to the first force unit access write data and the write data to the disk.

17. The method of claim 16 wherein the write data comprises a second force unit access write data.

18. The method of claim 17 further comprising:

writing the second force unit access write data to the cache as part of the cache data;

writing the second force unit access write data and a third metadata corresponding to the second force unit access write data to the second location; and transmitting a second write complete status to the host.

19. The method of claim 18 further comprising:

receiving a second force unit access write command from the host.

20. The method of claim 18 wherein the second metadata is written to the third location.

21. The method of claim 20 wherein the first location and the second location are part of a first shingled zone and the third location is part of a second shingled zone different from the first shingled zone.

22. The method of claim 21 wherein the first shingled zone is a shingled zone allocated for force unit access write data.

23. The method of claim 22 wherein the first shingled zone is a shingled zone located closest to a position of a head actuated over the disk, when a controller received a force unit access write command from the host.

24. The method of claim 21 further comprising decrementing a valid data counter corresponding to the first shingled zone, after the cache data and the second metadata are written to the second shingled zone.

25. The method of claim 18 further comprising updating a mapping table after the cache data and the second metadata are written to the third location.

26. The method of claim 18 further comprising decrementing a valid data counter corresponding to a segment containing the first location and the second location, after the cache data and the third metadata are written to the third location.

27. The method of claim 18 further comprising decrementing a first valid data counter corresponding to a first segment containing the first location and decrementing a second valid data counter corresponding to a second segment containing the second location, after the cache data and the second metadata are written to the third location.

28. The method of claim 16 wherein the step of writing the cache data to the third location on the disk includes writing the cache data to the third location during a cache flush.

29. The method of claim 28 further comprising selecting the third location to be located sequentially after a location in a plurality of tracks of the disk that a head actuated over the disk was performing a write operation on before the cache flush.

* * * * *